United States Patent [19]

Banin

[11] 3,902,886

[45] *Sept. 2, 1975

[54] CLAY-ATTACHED MICRONUTRIENTS

[75] Inventor: Amos Banin, Rehovot, Israel

[73] Assignee: Yissum Research Development Company of the Hebrew University of Jerusalem, Jerusalem, Israel

[ * ] Notice: The portion of the term of this patent subsequent to Apr. 3, 1990, has been disclaimed.

[22] Filed: Aug. 2, 1971

[21] Appl. No.: 168,093

Related U.S. Application Data

[63] Continuation-in-part of Ser. No. 116,640, Feb. 18, 1971, Pat. No. 3,725,528.

[52] U.S. Cl. .............................. 71/64 G; 260/448 C
[51] Int. Cl.² ........................ C05G 3/04; C07F 5/06
[58] Field of Search ................ 71/1, 64 G; 99/2 CD; 23/111, 112, 113; 252/450; 260/448 C; 106/72

[56] References Cited

UNITED STATES PATENTS

| | | | |
|---|---|---|---|
| 2,531,396 | 11/1950 | Carter et al. | 71/64 G |
| 2,683,658 | 7/1954 | Saunders et al. | 71/1 |
| 2,978,309 | 4/1961 | Buc | 71/1 |
| 3,062,637 | 11/1962 | Marples | 71/64 G |
| 3,082,074 | 3/1963 | Handley et al. | 71/1 |
| 3,113,858 | 12/1963 | Slack et al. | 71/64 C |
| 3,725,528 | 4/1973 | Banin | 423/112 |

Primary Examiner—Frank A. Spear, Jr.
Assistant Examiner—Ferris H. Lander
Attorney, Agent, or Firm—Thompson, Birch, Gauthier & Samuels

[57] ABSTRACT

Cation-saturated clays such as iron-clay, zinc-clay, manganese-clay and copper-clay are utilized as a source of micronutrients for plants.

8 Claims, 2 Drawing Figures

(a) no Zn application;
(b) 2.5 ppm Zn applied in the form of salt solution;
(c) 2.5 ppm Zn applied in the form of clay-attached micronutrient.

RESULTS ARE AVERAGES OF 3 REPLICATIONS OF EACH TREATMENT; PERIOD OF GROWTH — 42 DAYS

Yield and Zn content of tomato plants growing on loessial soils

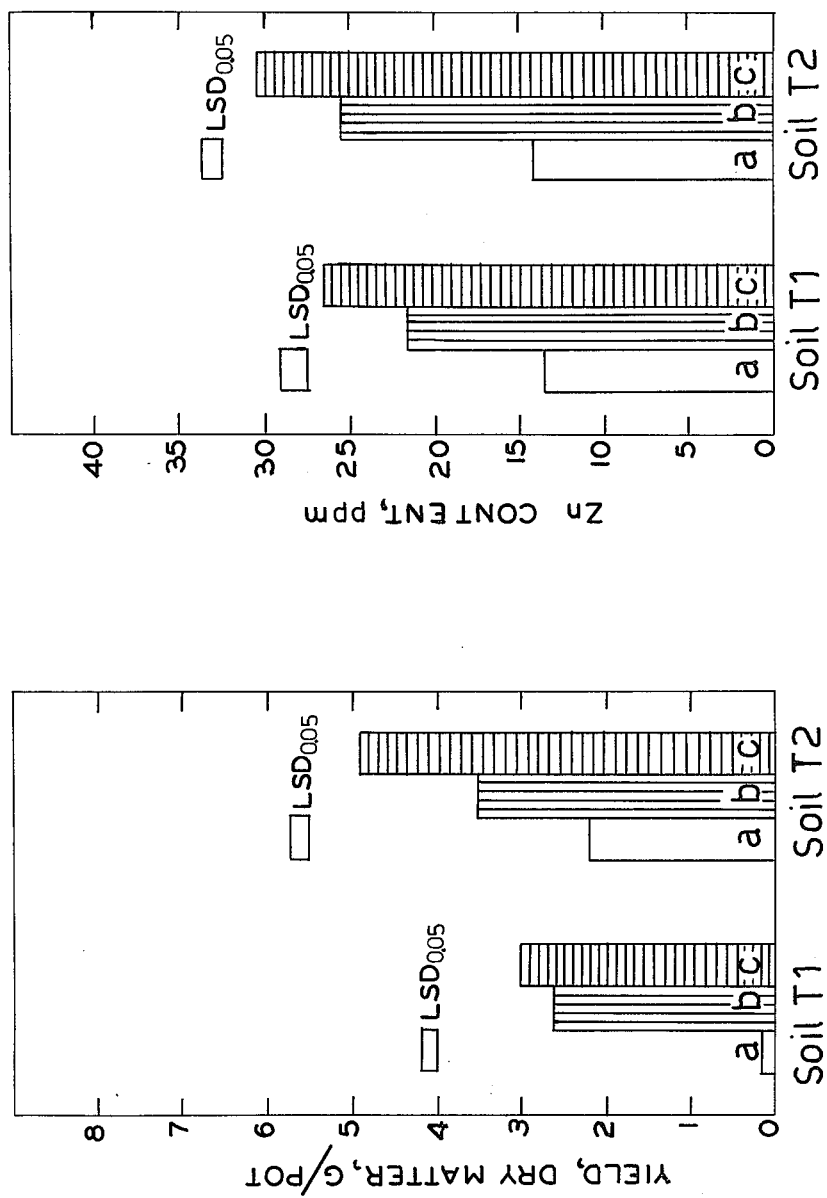
FIG.1 Yield and Zn content of tomato plants growing on loessial soils

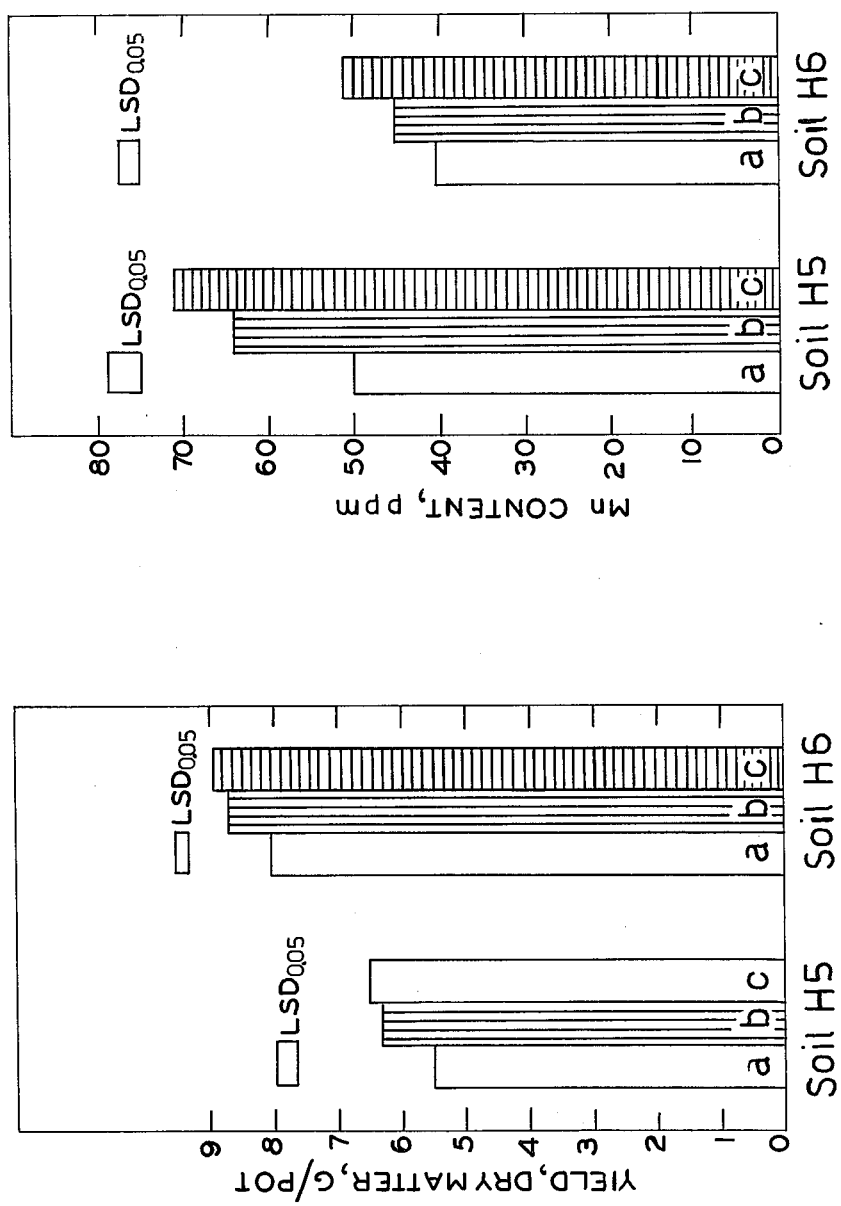
FIG.2 Yield and Mn content of tomato plants growing on alluvial soils 3,902,886

CLAY-ATTACHED MICRONUTRIENTS

CROSS REFERENCE TO RELATED APPLICATIONS

This application is a continuation-in-part of application Ser. No. 116,640 filed Feb. 18, 1971, now U.S. Pat. No. 3,725,528.

BACKGROUND OF THE INVENTION

Proper plant development requires the addition of very small quantities of several essential elements such as iron, zinc, manganese and copper. These elements are called micronutrients. They are usually active as co-enzymes and essential components of active metabolic systems in plant tissues.

A common feature of these micronutrients with regard to plant development is that although the quantities needed are very small, deficiencies in plants are common. The reason for this is the very low content in the soil of these micronutrients and the extensive fixation reactions they undergo there. See Mitchell, R. L. "Trace Elements in Soils", pp. 320–360 in *Chemistry of the Soil*, Bear F. E., ed., 2nd ed. (1964). On the other hand, even slight increases of the micronutrient elemental content in plant tissue can be toxic or can interfere with the proper activity of the plant and reduce the yield.

Due to the rapid development of intensive agriculture, the introduction of "high potential" plant varieties and the extended useage of soils, micronutrient deficiencies are becoming limiting factors for the efficient and profitable production of crops.

In the past, micronutrients have been given to plants either as the inorganic salts (mainly sulfates) or in chelated forms, bound to various organic ligands.

Such prior art methods of applying micronutrients have not been entirely satisfactory.

The inorganic salts, when applied directly to the soil, usually undergo precipitation, absorption and complexation reactions which render them unavailable, and thus are not always efficient in curing micronutrient deficiencies. They may also be applied by spraying them directly on the leaves in the form of aerosols. However, it is known that in many cases plant leaves are spot-damaged by the high salt concentrations in these sprayed formulations.

The chelated forms were first used as carriers of micronutrients such as iron for citrus trees many years ago. See, for example, Leonard, C. D. and Steward, I., "Correction of Iron Chlorosis in Citrus with Chelated Iron", *Proc. Fla. Sta. Hort. Soc.*, 65, P. 20–24 (1952), and since then have been found to be efficient for the correction of iron-induced chlorosis and some other micronutrient-deficiency symptoms in plants grown on various soils. See Wallace, A., "A Decade of Synthetic Chelating Agents in Inorganic Plant Nutrition", Copyright of the author, 195 p. (1962). Several kinds of chelates have been developed and are used presently. Generally, they are small-size organic molecules in the 300–400 molecular weight range. They form highly stable ring bonds with the transition metals, and differ from each other mainly in the stability constants and in their dissociation-pH curves. Chelates are synthesized by various processes in the United States and Western Europe and are used almost exclusively in the developed countries as a source of micronutrients.

During the many years that have passed since chelates were first introduced into this field, the search for other carriers and means of supply of micronutrients has continued because of several limitations and difficulties encountered in the usage of the chelates.

These limitations of the prior art may be divided into the following four aspects: (1) biological aspects; (2) agrochemical-agrotechnical aspects; (3) economic aspects; and (4) environmental aspects.

In view of the need in the art for improved micronutrient carriers, the present invention provides clay-attached micronutrients. In accord with the invention, it has been discovered that micronutrients can be utilized in the form of clays such as zinc-montmorillonite or iron-montmillonite with several unexpected advantages. The clay-attached micronutrients of the present invention will be described in more detail hereinafter but will be referred to for convenience simply as "clay-attached micronutrients."

The advantages of clay-attached micronutrients compared to chelates are discussed below:

1. Biological Aspects

One serious disadvantage of chelates is that they can penetrate living membranes. It has been reported that at neutral pH, EDDHA (Chel 138) was taken by the plant in a 1:1 ratio to the Fe. Jeffrey, R. A., Hale, V. Q., and Wallace, A., "Uptake and Translocation in Plants of Labelled Iron and Labelled Chelating Agents", *Soil Science*, 92, p. 268 (1961). Using $C^{14}$-labelled chelating agents, penetration into existing fruits on plants has been reported. Hale, V. Q. and Wallace, A, "Translocation and Retranslocation of $C^{14}$-Labelled Chelating Agents in Plants", *Proc. Amer. Soc. Hort. Sci.*, 78, p. 597 (1961). The penetrating molecules can interact with cell components, especially proteins. In other work, it has been reported that EDTA combines with the cytochrome enzymes. Bonner, W. D., "The Effect of Sequestrene of the Cytochrome System", *Plant Physiol.*, 30 (suppl.) 29 (1955). Although the chelates apparently decompose in the plant, it took 24 days for a 60% fraction of $C^{14}$ introduced as $C^{14}$-EDTA to be lost from tomato plants. See Hill-Cotingham, D. C. and Lloyd-Jones, C. P., "Adsorption and Breakdown of Fe-EDTA-acid by Tomato Plants", *Nature*, 189, 312 (1961). Thus, chelates may interfere with normal plant activity and reduce plant yield.

The clay-attached micronutrients of the present invention have relatively large particles $(0.1–0.5\mu) \times (0.001–0.2\mu)$ carrying a large number of electrostatically bound micronutrient cations. Only the cations penetrate the plant, and no biological interferences from the clay can occur. Furthermore, clays are compatible with all biological systems, since evolutionary development has taken place in the presence of clays.

2. Agrochemical and Agrotechnical Aspects

Chelates are soluble in water and render their bound micronutrients soluble and mobile in the soil. This is the main advantage and strength of chelate-attached micronutrients in curing deficiency symptoms. However, because of this mobility chelates are also subject to leaching out of the plant root-zone or to high rate of uptake into the plant. Therefore, the application of too high an amount of chelated micronutrients often results in toxicity symptoms and crop reduction. Optimal plant development needs a constant low concentration and permanent supply of the trace-elements to the roots as explained in Wallace, A., "A Decade of Synthetic Chelating Agents in Inorganic Plant Nutrition", Copyright of the author, 195 p. (1962). Clay-attached micronutrients, on the other hand, have larger particles and are not as mobile; they can be spread in the soil but generally, because of their particle size, will stay in the upper, root-rich horizon of the soil.

The release rate from chelates is mainly dependent on shifts in the equilibrium conditions in the system: the chelate releases the chelated micronutrient ion in exchange for another ion which may also be a trace-element coming from the soil. In clay-attached micronutrients, both equilibrium and kinetic factors affect the rate of release and thus the rate can be controlled; See for example, Banin, A. "Tactoid formation in montmorillonite: Effect on Ion Exchange Kinetics" *Science* 155, p. 71 (1967).

3. Economical Aspects

The economics of the application of micronutrients involves several factors including but not limited to the cost per unit of active element. For example, a unit weight of iron in inorganic salts costs about 1:100 less than in chelates. However, the quantities applied in the field per plant or per unit area as chelated forms, are generally at least 10 times smaller than those applied in the inorganic forms thus reducing the effective price ratio of the materials to 1:10, and even less. Furthermore, the application operation itself is very costly. According to an agronomist working in this field and citing as an example application to pecan — in spray application to these large trees the price of the material is only about 5–6% of the operation cost if zinc-sulfate is used, and 13–17% if Zn-Chelate is used. Clearly, the major savings will result if the number of applications per growth period can be reduced, even if the material applied in each of them is more costly. This calls for a controlled slow release source of micronutrients that will supply the elements during a long fraction of the plant growth period. Further, by combining the whole micronutrient spectrum in such a source, each element can be given in the proportion specifically needed by the crop.

Clay-attached micronutrients may have the desirable controlled slow release and can be prepared with the desired combination of micronutrients, particularly when utilization is made of a preferred "quantitative ion exchange process", as disclosed in the aforesaid application Ser. No. 116,640, for preparation of the clay-attached micronutrients.

4. Environmental Aspects

Very recent reports such as found in "A Solution Becomes a Problem", *Science News*, 98, 475, (Dec. 26, 1970), indicate that because of environmental safety considerations, the input of chelates into the Biosphere should and may be limited to a rate commensurate with its biodegradation and dilution rates in the environment. This puts a "ceiling" on the quantities of chelates that may be used in agriculture, and calls for a safer carrier, such as the clays utilized in the clay-attached micronutrients of the present invention.

SUMMARY OF THE INVENTION

The present invention relates to the utilization of clay-attached micronutrients as a source of micronutrient supply to growing plants. As used herein, the term "clay-attached micronutrients" defines cation-saturated clays selected from the group consisting of iron-clay, zinc-clay, manganese-clay, and copper-clay. Such cation-saturated clays can be prepared by exchanging the naturally occurring exchangeable cation such as calcium, magnesium, hydrogen, potassium, sodium or mixtures thereof with a micronutrient cation such as iron, zinc, manganese and copper or mixtures thereof.

BRIEF DESCRIPTION OF THE DRAWINGS

The drawings appended hereto show the comparative effect on tomato plants of the addition of Zn and Mn micronutrient when applied to the plants in the form of a salt solution or in the form of a clay-attached micronutrient. It can be seen from Bar (c) in each figure that the clay-attached micronutrient provides superior results.

DETAILS OF THE INVENTION

As noted above, the clay-attached micronutrients useful in the present invention can be prepared by exchanging the naturally occuring cation in clay with a micronutrient cation.

In general, clays of halloysite, illite, kaolinite, montmorillonite, palygorskite groups and various unclassified clays can be readily converted to cation-clays to be used as clay-attached micronutrients in this invention.

Members of the halloysite group include: allophane, endellite, halloysite, indianite, metahalloysite, schrotterrite, etc.

Example members of the illite group are brammallite, bravaisite, glimmerton, hydromica, sericite, etc.

Kaolinite is commonly found with other members of the kaolinite group including: anauxite or ionite, collyrite, dickite, ferrikaolinite, nacrite, neokaolin, metakaolin, metanacrite, severite, etc.

The montmorillonite group includes the following: "Amargosite" beidellite, bentonite, chloropal, erinite, ferromontmorillonite, hectorite, metabentonite, montmorillonite, nontronite, otaylite, saponite, etc.

The palygorskite group includes the following clays: attapulgite, calciopalygorskite, lasallite, palygorskite paramontmorillonite, parasepiolite, sepiolite, etc.

Various unclassified clays which can be used are: faratsihite, glacialite, grundite, potash montmorillonite, potash bentonite, ptilolite, sericite, muscovite, etc.

As noted above, any of the aforementioned clay minerals can be converted to clay-attached micronutrients for use in this invention. Of these clays, those of the montmorillite group are preferred and within the group montmorillite itself is most preferred. This preferred clay has a typical structural formula corresponding to Formula I, wherein X is an exchangeable metallic cation selected from the group consisting of calcium, magnesium, hydrogen, sodium, potassium and mixtures thereof. Such material is naturally occurring and is in abundant commercial supply throughout the world.

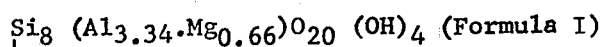

Thus, preferred clay-attached micronutrients of the present invention correspond in general to Formula I wherein X is a micronutrient selected from the group consisting of iron, zinc, manganese and copper.

Preferably, the clay-attached micronutrient is prepared from naturally occurring clay by the Quantitative Ion Exchange Process disclosed in aforesaid application Ser. No. 116,640. In this process, the natural clay material is first pre-treated with an excess of acid to displace the exchangeable cations of the clay with hydrogen ions and thus to convert it to hydrogenclay.

Any strong acid can be used for pre-treating the clay such as hydrochloric, sulfuric, nitric or similar strong acids. Of these, hydrochloric acid is preferred.

The acid treating step can be carried out at room temperature, e.g., 20–30 C., but is preferably carried out at about 5 C. since at high temperatures the clay may tend to decompose in the presence of strong acid.

The acid pre-treatment can be effected by, but is not necessarily restricted to, known processes such as are employed in the manufacture of decolorizing clays. Normally, the acid treatment is carried out by adding mineral acid such as hydrochloric acid or sulfuric acid to the clay while the clay is in finely divided form and suspended in water in the form of a slurry. Alternatively, dilute mineral acid can be added directly to the finely divided clay. Such acid treatments of montmorillonite types of clay are described in U.S. Pat. Nos. 1,397,113, 1,579,326, 1,642,871, 2,470,872, 2,472,489, 2,484,828 and 2,553,239.

An acid strength and amount can be used in the acid treatment to preferably provide a clay-acid mixture having a pH of about 1. Preferably, the acid treatment is carried out in several stages where each stage comprises the steps of adding the acid to the clay in a ratio of 1:3–1:7 w/w clay to solution, mixing or agitating, e.g., for 5 to 60 minutes, to form a suspension of clay in acid, and then separating the clay from the acid, e.g., by sedimentation or centrifugation.

Multi-stage treatment involving relatively rapid mixing steps is preferred compared to a single state treatment involving a longer mixing step because the clay can slowly dissolve in the acid over a period of time. On the other hand, it is desirable to dissolve and thus separate from the clay any contaminants which may be present. Accordingly, two to five stages each comprising adding acid to the clay, mixing for 10 to 30 minutes and separating the clay from the acid, is preferred.

At the end of the acid treatment step, all of the exchangeable metallic cations of the clay will have been replaced by hydrogen ions, i.e., a saturated hydrogen-clay will be obtained. However, free acid will also be associated with the hydrogen-clay due to the acid treatment.

Hydrogen-clay separated in the last stage of the acid treatment step and its associated free acid is then added to water to form a mixture of hydrogen-clay and acid which mixture comprises the starting material in the next step. Alternatively, the hydrogen-clay and acid mixture obtained in the last stage of the acid treatment step prior to separation, can comprise the starting material in the next step. In either case, the acid mixture preferably has a pH of 1 to 4, most preferably 1.5 to 2.9.

In the next step of the process, an anion exchange resin in the hydroxide state is mixed with the hydrogen-clay and acid mixture. The resin can be added directly to the mixture to form a slurry or the resin can be placed in a basket which in turn is swirled or rotated through the mixture. When the resin contacts the mixture, it interacts with the hydrogen-clay and the free acid.

The anion of the free acid, e.g., $Cl^-$ if hydrochloric acid was used in the acid pre-treatment step, ion-exchanges with the hydroxide of the resin while the released hydroxide reacts with the free hydrogen in the solution to form water.

An equivalent amount of a iron, zinc, manganese or copper, or mixtures thereof, salt is mixed with the hydrogenclay mixture while in the presence of the resin. Preferably, the salt is added at a point when the pH of the system is from about 3 to 3.5 which corresponds to an electrical conductivity of about 100 to 200 micro mho/cm.

It is important that an equivalent amount of salt be added. By "equivalent amount" is meant an amount of salt which is equivalent to the total exchange capacity of the clay in the system and/or the quantity of hydrogen in the system, whichever is smaller.

When the salt is added to the system, the cations of the salt ion-exchange with the adsorbed hydrogen ions of the hydrogen clay while the anions of the salt release hydroxide from the resin.

When the reaction is completed, which normally takes from about 5 to 60 minutes, preferably 10 to 30 minutes, after the salt is added, the system has a pH of about 5.5 to 7.5, preferably 6 to 7. At this point, the micronutrient cation of the salt has completely and quantitatively replaced the adsorbed hydrogen of the hydrogen-clay and a hydrogen-free, acid-free, salt-free cation-saturated clay is obtained. This cation-clay is a clay-attached micronutrient and can be used as such a suspension or, alternatively, can then be separated from the system and dried by conventional methods, e.g., by forced air, or by centrifugation or sedimentation and then freeze-drying the resulting paste.

The resin can also be separated from the system, e.g., by filtration, and can be reused after regeneration.

A wide variety of anion exchange resins are commercially available and can be used in effecting the above process. Preferred are the strongly basic anion exchange resins which contain quaternary ammonium active groups on a cross-linked polystyrenedivinylbenzene matrix. Examples of such commercial materials are the "Amberlites" (Rohm & Haas) such as IRA-400, IRA-401, and IRA-410, "Dowex 1-28" (Dow), and "De-Acidite FFIP" (Permutit). Other equivalent materials having strongly basic anion exchange capacity can also be used.

Further details on the preferred process for preparing the clay-attached micronutrients of the invention can be found in the disclosure of the aforesaid application Ser. No. 116,640, hereby incorporated herein by reference.

EXAMPLE 1

Preparation of Zinc saturated clay useful as a Clay-attached Micronutrient

Crude montmorillonite (Wyoming bentonite) clay containing 35 and 47 meq/100 gr, respectively, of exchangeable $Na^+$ and ($Ca^{++} + Mg^{++}$), and 25 meq/100 gr soluble salts was first converted to the hydrogen state as follows:

The clay was suspended in 0.5 N HCl (technical grade) solution in a ratio of 1:5 w/w clay to solution to provide a slurry. The slurry was then agitated at room temperature for 20 minutes. The clay was sedimented by centrifugation at 1000 RCF for 10 minutes. Acid solution was discarded and clay was resuspended in the fresh acid solution at the same clay-to-solution ratio. The slurry was agitated overnight and then centrifuged as above. The clay was again resuspended in acid, agitated for 20 minutes and centrifuged for 20 minutes at 2000 RCF. The hydrogen-clay sediment was then homogenized and kept at 4 C. for further use.

A 13.1 gr clay/liter hydrogen-clay suspension in deionized water was prepared by adding the homogenized by hydrogenclay prepared as above to deionized water. The pH of the suspension was 1.5 and the electrical conductivity of the suspension was 3.6 milli mho/cm. The hydrogen concentration in the suspension was estimated to be 25 meq/L.

45 ml of wet, OH-saturated, anion exchange resin containing quaternary ammonium active groups on a cross-linked polystyrene-divinylbenzene matrix (Rohm and Haas IRA-410) in the particle size range of 20–50 mesh, was added per liter of suspension to give a ratio of 1:1.5 of $H^+$ to $OH^-$ in the system. The resin beads were enclosed in a mesh basket that was stirred in the suspension. Electrical conductivity of the suspension was continuously monitored and recorded. When the conductivity reached a value of 150 micro mho/cm, which took 15 minutes, 650 mg. of $ZnCl_2$ salt were added per each liter of suspension as the 1 N solution. The total amount of added $ZnCl_2$ was equivalent to the cation exchange capacity of the hydrogen-clay in the system.

When the reaction was completed in 30 minutes as shown by no further change in electrical conductivity and/or pH of the suspension, the resin basket was taken out of the suspension.

The zinc-clay was then dried by forcing air at 40 C. above it. Equivalent results can be obtained when the clay is dried by centrifugation and freeze-drying of the paste.

The zinc-clay obtained had the following properties:

| | |
|---|---|
| Electrical conductivity | 64.2 micro mho/cm, 25C. |
| pH: Fresh suspension | 6.9 |
| after 15 days | 4.2 |
| Average relative tactoid size | 2.7 – 2.8 plates |
| Effective external surface area | 250 – 270 m²/g clay |
| Exchangeable Zn content | 23.7 mg/gr clay |
| | or |
| | 72.9 meq $Zn^{++}$/100 gr clay |

EXAMPLE 2

Preparation of Copper-Saturated Clay Useful as a Clay-attached Micronutrient

The procedure described in Example 1 was carried out with the exceptions that a hydrogen-clay suspension containing 11.4 gr clay/liter was prepared and 490 mg $CuCl_2$ were added as the 1N $CuCl_2$ solution.

The copper-clay obtained had the following properties:

| | |
|---|---|
| Electrical conductivity | 28.6 micro mho/cm, 25C. |
| pH: Fresh suspension | 7.0 |
| after 15 days | 4.2 |
| Average relative tactoid size | 2.6 – 2.7 plates |
| Effective external surface area | 280 – 290 m²/g clay |
| Exchangeable Cu content | 20.0 mg/gr clay |
| | or |
| | 63.0 meq $Cu^{++}$/100 gr clay |

EXAMPLE 3

Preparation of Iron-Saturated Clay Useful as a Clay-attached Micronutrient

The procedure described in Example 1 was carried out with the exceptions that a hydrogen clay suspension containing 21.0 gr clay/liter was prepared and 1120 mg $FeCl_2$ were added as the 1N $FeCl_2$ solution.

The iron-clay obtained had the following properties:

| | |
|---|---|
| Electrical conductivity | 12 micro mho/cm, 25 C. |
| pH: Fresh suspension | 7.0 |
| after 15 days | 6.1 |
| Average relative tactoid size | 4.0–4.25 plates |
| Effective external surface area | 170–190 m²/g clay |
| Exchangeable and replaceable Fe content | 23.2 mg/gr clay |
| | or 83.0 meq $Fe^{++}$/100 gr clay |
| of which: | |
| Exchangeable in 1N $CaCl_2$: | 64 meq/100 gr clay |
| Replaceable in 0.5N HCl: | 19 meq/100 gr clay |

EXAMPLE 4

Preparation of Manganese-Saturated Clay Useful as a Clay-attached Micronutrient

The procedure described in Example 1 was carried out with the exceptions that a hydrogen-clay suspension containing 10.4 gr clay/liter was prepared and 389 mg $MnCl_2$ were added as the 1N $MnCl_2$ solution.

The manganese-clay obtained had the following properties:

| | |
|---|---|
| Electrical conductivity | 21.9 micro mho/cm, 25C. |
| pH: Fresh suspension | 7.0 |
| after 15 days | 4.9 |
| Average relative tactoid size | 2.0–2.2 plates |
| Effective external surface area | 340–370 m²/g clay |
| Exchangeable Mn content | 16.4 mg/gr clay |
| | or |
| | 59.7 meq $Mn^{++}$/100 gr clay |

In the following described procedure, clay-attached Zn micronutrient prepared as in Example 1 and clay-attached Mn micronutrient prepared as in Example 4 were utilized in greenhouse experiments using two soil types and tomato as the indicator plant.

One soil type was loessial, sandy soil with pH 8.1, 6–8% $CaCO_3$, 0.3–0.9% organic matter, and relatively low in Zn content. Mn content was intermediate. The second soil type was an alluvial clayey soil, with pH 7.7, $CaCO_3$ 13–18%, organic matter 1.7–2.4%, and relatively high Zn and Mn contents. Samples of the two types of soils were collected from two sites each were dried, crushed, sieved through a 4 mm sieve, and filled into 5 kg. pots.

Tomato seeds (Lycopersicum esculentum Mill; variety Marmande) were sown, and the pots were placed in a greenhouse. Basic dressings of the major nutrients (N,P,K,) were added to all the pots. Micronutrients were added except to the controls, either as a solution in the chloride form or as montmorillonite clay-attached micronutrients in aqueous suspensions. Five hundred milliliters of solution or suspension, containing the appropriate quantity of micronutrient, were added to each pot as part of the irrigation schedule.

The Zn and Mn clay-attached micronutrient suspensions contained only adsorbed cations and no free electrolyte. After 40–60 days, the plants were harvested, dried at 70 C. and weighed to determine the dry matter yield. Zn and Mn content in the plants was determined by atomic absorption after ashing the plant material.

RESULTS

The loessial soils (designated T-1 and T-2) are known from previous experimental studies to be zinc deficient. During the growth period, symptoms of zinc deficiency were observed in all plants grown in these soils except those to which zinc was applied. A highly significant response of tomato plants to zinc addition in both salt and clay-attached forms was obtained as shown in FIG. 1. The yields as well as the zinc contents of the plants were higher by about 20 to 50% in the clay-attached Zn micronutrients than in the Zn-salt treatment. The calcareous alluvial soils (H-5 and H-6) are not considered to be deficient in manganese according to accepted criteria, such as those suggested by Jones, L. H. and G. W. Leeper, 1951. Available manganese oxides in neutral and alkali soils. *Plant and Soil* 3:154–159. Nevertheless, plants grown on these soils showed a significant, although low, response to the addition of Mn, either in the form of salt or attached to clay, as shown in FIG. 2. There was a trend toward higher yields, and higher Mn content in the plant, with the clay-attached micronutrient treatment.

In another experiment, Zn, Mn, and a combination of Zn and Mn were added to an alluvial soil. The addition of the micronutrients in the clay-attached form, as compared to their addition in salt solution, again resulted in higher plant yields, as shown in Table 1. In one case, the Mn added as salt caused decreased plant development, possibly as a result of Mn toxicity due to high concentrations in the initial stage of the plant growth. The uptake of the micronutrients by plants was significantly affected by the form in which they were added, and was generally higher when the nutrients were added in the clay-attached form.

Table 1

Tomato Plant Yield and Zinc and Manganese Uptake and Contents after Addition of Zn and Mn, in Solution or as Clay-attached Micronutrient, to an Alluvial Soil.*

|  | Control | Zn added in form of | | Mn added in form of | | Zn+Mn added in form of | |
| --- | --- | --- | --- | --- | --- | --- | --- |
|  |  | Salt Solution | Clay-attached | Salt Solution | Clay-Attached | Salt Solution | Clay Attached |
| Dry Matter Yield, g/pot | 6.2 | 8.9 | 10.7 | 2.6 | 6.9 | 9.1 | 9.9 |
| Yield Relative to control, % | 100 | 143 | 173 | 43 | 111 | 147 | 160 |
| Zn content, ppm | 23 | 32 | 28 | 29 | 28 | 38 | 28 |
| Zn uptake, mg/pot | 0.14 | 0.24 | 0.30 | 0.07 | 0.19 | 0.35 | 0.28 |
| Mn content ppm | 70 | 76 | 88 | 100 | 108 | 120 | 114 |
| Mn uptake, mg/pot | 0.43 | 0.68 | 0.94 | 0.26 | 0.74 | 1.09 | 1.13 |

*Experimental Conditions:
Micronutrients rate of application: Zn-2.5ppm (soil weight basis) Mn-7.5ppm
Amount of Clay: Zn treatment: 0.59 g/pot
Mn treatment: 1.63 g/pot
Period of Growth: 56 Days.

Table 2

Yields of Tomato Plants as a Function of Addition of Various Cation Forms of Montmorillonite Clay-attached Micronutrients to Alluvial Soil.

|  | Control (no addition of clay) | Addition of: | | | |
| --- | --- | --- | --- | --- | --- |
|  |  | I | | II | |
|  |  | Zn-clay 0.59g/pot | Equivalent Ca-clay | Mn-clay 1.63g/pot | Equivalent Ca-clay |
| Yield, g/pot | 7.82 | 9.6 | 7.9 | 8.6 | 7.2 |
| Yield relative to control, % | 100 | 124 | 101 | 110 | 92 |

(Period of Growth: 42 Days)

It might have been postulated that the increased plant yields following the clay-attached micronutrient treatments resulted from some effects of the clay per se on the soil, for example, on its structure or water retention properties. To test this possibility, another experiment was carried out in which clay calcium saturated clay as an aqueous suspension (at the rates of application of 0.59 and 1.63 g clay/pot, to correspond to the Zn and Mn treatments respectively) was added to alluvial soil (H-5). The yield results are given in Table 2, and are compared with experimental pots grown at the same time to which Zn and Mn in the clay-attached form were added. The results do not support the hypothesis of clay affects and confirm that increased yields are a function of micronutrient supply, especially so when in the clay-attached form.

DISCUSSION

The above experiments show that plants can absorb micronutrients in the form of montmorillonite clay-attached micronutrients in accord with the present invention. Moreover, the rate of uptake and the plant yield is usually higher when micronutrients are supplied in the clay-attached form than in the salt form. No specific effects of clay addition per se were found. Thus the increased micronutrient uptake and the resulting increased yield were due to higher availability of the elements to the plant during the growth period. That the flux of ions reaching the plant roots was greater with the clay-attached micronutrient can be explained by the slower rate of precipitation of micronutrient ions bound to montmorillonite clay surfaces, as compared with these ions in salt solutions. Thus, when clay-attached micronutrients are added to soils, a source of exchangeable element is maintained in the soil for a longer period than if it were in the soluble form. In the complex competition between uptake by plant roots and the various precipitation and fixation reactions occurring in the soil, a favorable shift towards uptake occurs.

It is known that a granular source of a nutrient element which undergoes soil fixation can supply the nutrient to plants in a very efficient way, since the environment of the granule is saturated, and high concentrations of the element are maintained around it. See Barber, S. A., and R. P. Hubert, 1963. Advances in knowledge of potassium relationships in the soil and plant, in Fertilizer Technology and Usage, Symposium publ. by *Soil Sci. Soc. Amer.*, Madison, Wisc., Cooke, C. W. 1960. Recent advantages in fertilizer placement. *J. Sci. Food Agric.* 5:252–256., Ohlrogge, A. J. 1962. Some soil-root-plant relationships. *Soil Sci.* 93:30–38., and Prummel, I. 1957. Fertilizer placement experiments. *Plant and Soil* 8:231–253. However, large size fertilizer granules usually are spaced at relatively large distances in the soil and may not be intercepted by the root. On the other hand, the clay particles of the invention are microscopic in size and are thus more evenly distributed within the soil volume, increasing the probability of root interception. Therefore, the novel method of micronutrient application disclosed herein combines the advantages of the higher ionic activity of the granule-placement method and the better distribution of the powdered fertilizer application.

The clay-attached micronutrients of the present invention can be administered directly to plants or to the environment in which the plants are growing as a source of micronutrient for the plant.

Preferably, the clay-attached micronutrients are administered to plants in the form of a dosage unit of the clay-attached micronutrient. A dosage unit facilitates administration of the clay-attached micronutrient to the plant being treated. A preferred dosage unit comprises from about 0.001 to 90%, most preferably, about 0.1 to 50%, of the clay-attached micronutrient. The dosage unit forms can be of various embodiments. Preferably, the dosage unit form comprises a mixture of the clay-attached micronutrient with an adjuvant which is conventional in agricultural chemicals. For example, sand or water are agricultural chemical adjuvants which can be used in admixture which the clay-attached micronutrients of the invention to provide a dosage unit. Use of such a dosage unit not only enables an appropriate does to be administered to the plant being treated, but enables administration to be affected in a uniform manner, e.g., by use of a mechanical spreader. A preferred dosage unit form comprises a suspension of the clay-attached micronutrient of the invention in a suitable liquid, e.g., water. This dosage unit form enables controlled administration by spraying and the like. A preferred suspension comprises from about 0.1 to about 6%, most preferably from about 0.5 to about 3%, of the clay-attached micronutrient in water. Such suspensions preferably have a pH from 4 to 7.

Although exact modes, dosages, and frequency of application of the clay-attached micronutrient to the plant will vary with the plant, the climate and the natural soil conditions, the determination of such matters can readily be made by those skilled in the art. The following are set forth as general illustrations:

A. Soil Applications

1. Apply in suspension to soil surface.
2. Apply as a dry powder to soil surface.
3. Apply in the dry form mixed with an inert carrier.
4. Apply in dry form mixed with fertilizer.
5. Apply as granulated material to soil surface, and/or deeper soil layers.

B. Foliage Applications

1. Apply as thorough cover spray containing 1–2% suspension clay-attached micronutrients in water.

C. Injection Applications

1. Injection of clay-attached micronutrient suspension into stems or trunks of plants.
2. Injection of clay-attached micronutrient paste into stems or trunks of plants.
3. Injection of clay-attached micronutrient into stems or trunks of plants in dry form.

D. Seed Treatment

Treatment of seeds of annual and perennial plants with clay-attached micronutrient suspension, paste or powder.

Although the invention has been particularly described with respect to the treatment of tomatoes, it will be apparent that the clay-attached micronutrient of the invention can be used to supply micronutrients to any and all growing plants, such as: vegetables, e.g., corn, beans and peanuts; fruit, e.g., citrus, avacado, and pecan or other nuts; field crops; and orchards.

What is claimed is:

1. A method of supplying metallic micronutrients to plants at a controlled rate which comprises the steps of:
   a. preparing a natural cation clay by contacting a hydrogen clay in an aqueous slurry with an equivalent amount of a salt containing a cation to be exchanged in the presence of an anion-exchange resin in the hydroxide state, thereby exchanging quantitatively the cations of the salt for the adsorbed hydrogen of the clay; and thereafter recovering an acid-free salt-free cation clay; and
   b. treating plants suffering a micronutrient deficiency with said cation clay in an amount sufficient to correct, at least in part, said deficiency by the controlled transfer of said metallic micronutrient from the clay to the plants.

2. The method of claim 1 wherein the clay-attached micronutrient comprises iron clay, zinc clay, manganese clay, copper clay and combinations and mixtures thereof.

3. The method of claim 1 which includes treating the plants by applying the clay-attached micronutrient to the foliage of the plants.

4. The method of claim 1 wherein treating the plants includes injecting into the plants the clay-attached micronutrient.

5. The method of claim 1 wherein treating the plants includes adding to the soil in proximity to the root structure of the plants the clay-attached micronutrient.

6. The method of claim 1 wherein the clay is a hydrogen-free montmorillonite clay.

7. The method of claim 1 which includes treating the plants by placing the clay-attached micronutrient in an aqueous suspension in an amount ranging from about 0.1 to 6.0% by weight of the micronutrient.

8. The method of claim 1 which includes treating the plants with a clay-attached micronutrient having a particle size of from about 0.1 to 5 microns by 0.01 to 0.02 microns.

* * * * *